(12) United States Patent  (10) Patent No.: US 7,709,988 B2
Kaminski et al.  (45) Date of Patent: May 4, 2010

(54) METHODS AND APPARATUS FOR USING AN ELECTRICAL MACHINE TO TRANSPORT FLUIDS THROUGH A PIPELINE

(75) Inventors: Christopher Anthony Kaminski, Niskayuna, NY (US); Charles Michael Stephens, Pattersonville, NY (US); James Michael Fogarty, Schenectady, NY (US); Jeremy Daniel Van Dam, West Coxsackie, NY (US); John Russell Yagielski, Scotia, NY (US); Konrad Roman Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 11/400,093

(22) Filed: Apr. 7, 2006

(65) Prior Publication Data

US 2007/0236094 A1   Oct. 11, 2007

(51) Int. Cl.
*H02K 1/27*  (2006.01)
*H02K 15/03* (2006.01)

(52) U.S. Cl. .................................. 310/156.29
(58) Field of Classification Search ............ 310/156.29, 310/156.44, 156.31, 87, 85, 261, 271; *H02K 1/27, H02K 5/12, 21/14*
See application file for complete search history.

(56) References Cited

U.S. PATENT DOCUMENTS

| | | | |
|---|---|---|---|
| 2,552,169 A * | 5/1951 | Graham ..................... 99/282 |
| 2,669,668 A * | 2/1954 | Okulitch et al. ............ 310/104 |
| 4,999,533 A | 3/1991 | King et al. |
| 5,280,209 A | 1/1994 | Leupold et al. |
| 5,349,258 A | 9/1994 | Leupold et al. |
| 5,604,777 A | 2/1997 | Raymond et al. |
| 5,641,276 A | 6/1997 | Heidelberg et al. |
| 5,659,214 A | 8/1997 | Guardiani et al. |
| 5,674,057 A | 10/1997 | Guardiani et al. |
| 6,111,332 A | 8/2000 | Post |
| 6,254,361 B1 | 7/2001 | Sabini |
| 6,680,663 B1 | 1/2004 | Lee et al. |
| 6,711,805 B2 | 3/2004 | Joho |
| 6,822,359 B2 | 11/2004 | Joho |
| 6,841,910 B2 * | 1/2005 | Gery ......................... 310/103 |
| 6,847,140 B2 | 1/2005 | Kimberlin et al. |
| 6,858,962 B2 | 2/2005 | Post |
| 6,906,446 B2 | 6/2005 | Post |
| 6,948,578 B2 | 9/2005 | Prucher |
| 6,958,555 B2 | 10/2005 | Mikkelsen |

(Continued)

FOREIGN PATENT DOCUMENTS

DE   4205926 A1   9/1993

(Continued)

OTHER PUBLICATIONS

EPO Search Report, App. No. 07105648 (Aug. 2, 2007).

*Primary Examiner*—Javaid Nasri
(74) *Attorney, Agent, or Firm*—Armstrong Teasdale LLP

(57) ABSTRACT

An electrical machine to facilitate transporting fluids through a pipeline is provided. The electrical machine includes a rotor assembly that further includes an array of magnets configured to generate a distributed magnetic field. The rotor assembly has corrosion-resistant features that facilitates mitigating deleterious effects to the rotor assembly while being exposed to aggressive and harsh fluids.

7 Claims, 8 Drawing Sheets

U.S. PATENT DOCUMENTS

| | | |
|---|---|---|
| 7,053,508 B2 | 5/2006 | Kusase et al. |
| 2002/0180295 A1 | 12/2002 | Kaneda et al. |
| 2005/0040721 A1 | 2/2005 | Kusase et al. |
| 2006/0017339 A1 * | 1/2006 | Chordia et al. ................ 310/86 |

FOREIGN PATENT DOCUMENTS

| | | |
|---|---|---|
| DE | 10060121 A1 | 6/2002 |
| EP | 1024583 | 8/2000 |
| EP | 1209799 A2 | 5/2002 |

* cited by examiner

METHODS AND APPARATUS FOR USING AN ELECTRICAL MACHINE TO TRANSPORT FLUIDS THROUGH A PIPELINE

BACKGROUND OF THE INVENTION

This invention relates generally to fluid transport systems and, more particularly, to methods and apparatus for using an electrical machine to transport fluids through a pipeline.

Fluid transport is used in a variety of different industries including, but not limited to the chemical, oil and gas industries. In one known fluid transport application fluids are transported from on-shore or off-shore locations to processing plants for subsequent use. In other known applications, fluid transport is used in hydrocarbon processing industries and chemical industries, and to facilitate distribution to end-users.

At least some known fluid transport stations use fluid transport apparatus such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. Electrical machines (i.e., electrically-powered drive motors, or electric drives) may be advantageous over mechanical drives (i.e., gas turbines) in operational flexibility (variable speed for example), maintainability, lower capital cost and lower operational cost, better efficiency and environmental compatibility. Additionally, electric drives are generally simpler in construction than mechanical drives, generally require a smaller foot print, may be easier to integrate with the fluid transport apparatus, may eliminate the need for a gearbox, and/or may be more reliable than mechanical drives.

However, systems using electric drives may be less efficient than those systems using mechanical drives. At least some factors affecting electric drive efficiency include motor drive and drive controls electrical and electronic topologies, electrical power source quality and efficiency, size and weight of electric drive components (rotors for example) and magnetic coupling strength. Moreover, fluid transport apparatus electric drives generate heat via the drive components, via windage losses associated with the rotors for example, and may require supplemental systems to facilitate heat removal. For example, some known electric drives use the fluid being transported as the primary heat transfer medium and channel the fluid through and around the stator. However, in some cases, the fluid being transported may have aggressive constituents or impurities which may adversely affect the efficiency of the components being used.

BRIEF DESCRIPTION OF THE INVENTION

In one aspect, an electrical machine to facilitate transporting fluids through a pipeline is provided. The electrical machine includes a rotor assembly that further includes an array of magnets configured to generate a distributed magnetic field. The rotor assembly is substantially corrosion-resistant.

In another aspect, a method of assembling an electrical machine is provided. The method includes generating a distributed magnetic field. The method also includes coupling an array of permanent magnets within a substantially corrosion-resistant enclosure such that the array of permanent magnets is substantially isolated from an environment external to the enclosure.

In a further aspect, a fluid transport station is provided. The station includes a fluid transport assembly comprising at least one rotatable shaft. The fluid transport assembly also includes a drive motor. The drive motor includes a rotor assembly coupled to the rotatable shaft. The rotor assembly includes an array of magnets configured to generate a distributed magnetic field. The rotor assembly is substantially corrosion-resistant.

DETAILED DESCRIPTION OF THE INVENTION

Figure 1:
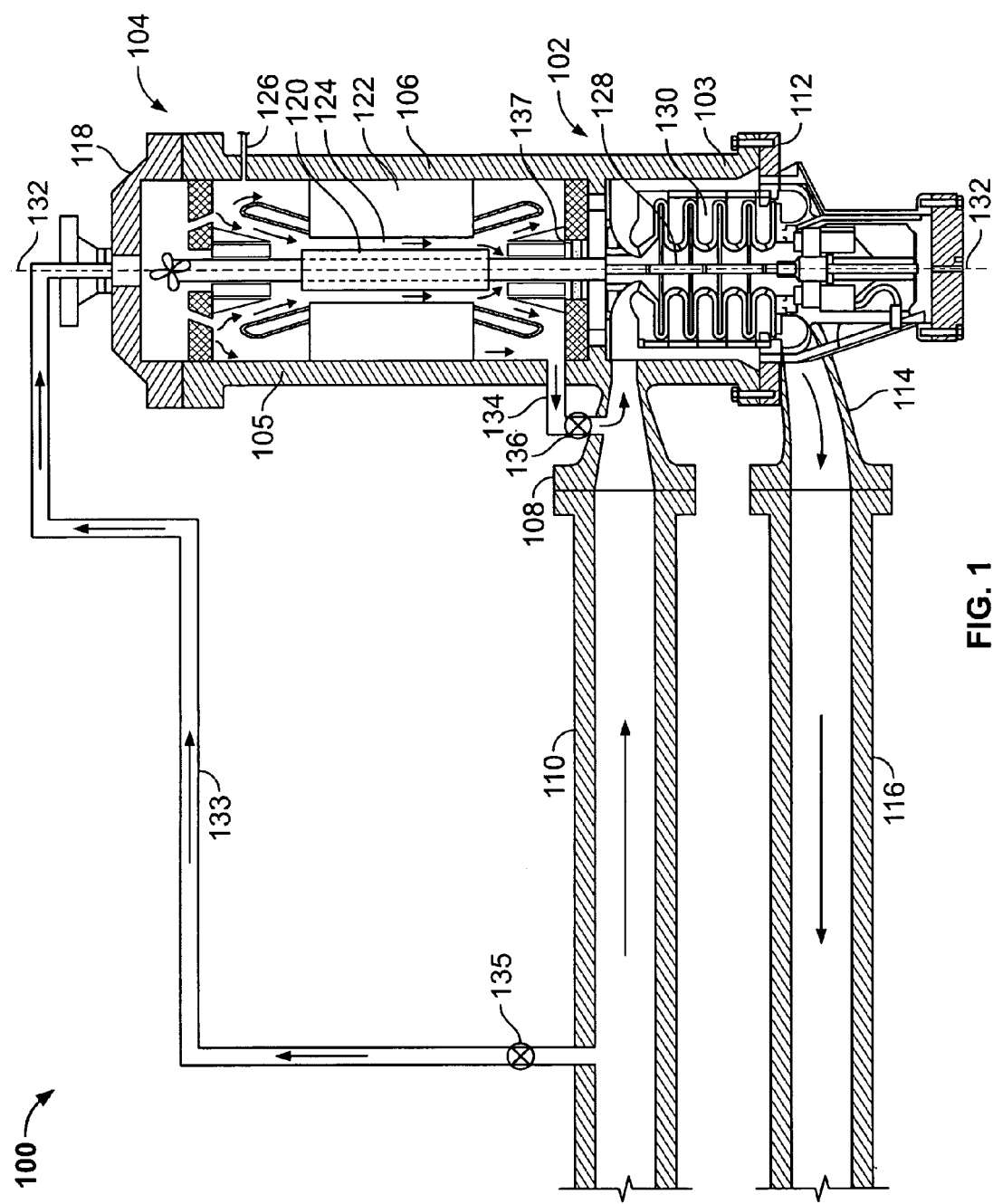
FIG. 1 is a cross-sectional schematic view of an exemplary fluid transport station.

FIG. 1 is a cross-sectional schematic view of an exemplary fluid transport station 100. In the exemplary embodiment, station 100 is a submerged natural gas compressing station 100 that includes a fluid transport assembly 102. In the exemplary embodiment, assembly 102 is a multi-stage compressor 102 that is rotatingly coupled to an electric drive motor 104. Alternatively, assembly 102 may be, but is not limited to being a pump or a fan. Station 100 may be positioned in any geographical location and may facilitate transport of any fluid wherein predetermined operational parameters are attained. Examples of fluids that may be transported by station 100 include, but are not limited to untreated methane channeled to station 100 from a natural source (not shown).

In the exemplary embodiment, motor 104 is a permanent magnet-type electric motor 104 designed for operating speeds above the maximum speed of 3600 revolutions per minute typically associated with synchronous motors powered by a 60 Hz electrical power source. Therefore, motor 104 is generally referred to as a "super-synchronous" motor. More specifically, in the exemplary embodiment, motor 104 includes a variety of features that may be advantageous over alternative drive mechanisms. For example, in the exemplary embodiment, motor 104 may attain speeds in a range of approximately 10,000 to 20,000 revolutions per minute (rpm) without using additional components, for example, gearboxes to facilitate increasing output speed. Alternatively, motor 104 speeds in excess of 20,000 rpm may be used. The increased speeds facilitate a rapid pressurization of the gas, thus increasing the efficiency and effectiveness of compressing station 100 which may facilitate a smaller footprint. Additionally, in this embodiment, the elimination of additional components, for example, gearboxes, results in station 100 requiring a smaller foot print and the elimination of the associated maintenance. Another feature of this embodiment is the elimination of wearable components, such as carbon-based slip rings. As a result, in the exemplary embodiment, the reliability of the compressing station 100 is facilitated to be increased with motor 104. Alternatively, motor 104 may be a permanent magnet-type synchronous motor, a separately excited motor, or any other drive device that attains predetermined operational parameters and that enables station 100 to function as described herein.

Motor 104 and compressor 102 are fixedly secured within a one-piece (i.e., unitary) housing 106. Motor 104 is positioned within a motor portion 105 of housing 106 and compressor 102 is positioned within a compressor portion 103 of housing 106. In the exemplary embodiment, housing 106 is fabricated via a casting or forging process. Alternatively, housing 106 may be fabricated using any method known in the art, for example, a welding process that enables housing 106 to be assembled to form a unitary housing 106 that functions as described herein. Further, alternatively, housing portions 103 and 105 may be fabricated as individual components and coupled together to form housing 106 by methods known in the art. Housing 106 includes a compressor suction fixture 108 that is coupled in flow communication to an inlet pipeline 110. Pipeline 110 may be fabricated of metal, rubber, polyvinylchloride (PVC), or any material that attains predetermined operational parameters associated with the fluid being transported and the location of station 100.

In the exemplary embodiment, station 100 also includes a compressor end piece 112, that is coupled to and extends outward from housing 106. End piece 112 facilitates enclosing compressor 102 within station 100 subsequent to insertion of compressor 102 into housing 106 and includes a compressor discharge fixture 114 that is coupled in flow communication to a compressor outlet pipeline 116 that is substantially similar to inlet pipeline 110. In addition, a motor end cover assembly 118 is fixedly coupled to housing 106. End cover 118 facilitates enclosing motor 104 within station 100 subsequent to insertion of motor 104 into housing 106.

Motor 104 includes a rotor assembly 120, a plurality of permanent magnets 148 (shown in FIG. 3) that are coupled to rotor assembly 120, and a stator 122 that are positioned such that a gap 124 is defined between stator 122 and rotor assembly 120. A plurality of power supply cables positioned within an electric cable conduit 126 facilitate coupling station 100 to a power source, for example, a variable frequency drive (VFD) (not shown). The permanent magnets generate a magnetic field 190 (shown in FIG. 5) around rotor assembly 120. When stator 122 is powered, an electromagnetic field is generated within motor 104. Gap 124 facilitates magnetic coupling of rotor assembly 120 and stator 122 to generate a torque that generates rotation in rotor assembly 120.

Compressor 102 includes a rotatable drive shaft 128 that is rotatably coupled to rotor 120. In the exemplary embodiment, compressor 102 includes a plurality of compressor stages 130. Alternatively, compressor 102 may include only one stage. Rotor 120 and shaft 128 are rotatable about an axis of rotation 132. Axis of rotation 132 ma be in any orientation that facilitates attaining predetermined operational parameters of station 100 that includes, but is not limited to, horizontal and vertical orientations.

During operation, the VFD supplies multi-phase alternating current to stator 122 at pre-determined voltages and frequencies. A rotating electromagnetic field 190 (shown in FIG. 5) is generated in stator 122. At any given speed a relative strength of the magnetic field generated is proportional to the voltage supplied by the VFD. As the electromagnetic field generated in stator 122 rotates, the magnetic field of rotor assembly 120 interacts with the electromagnetic field of stator 122 though gap 124. The interaction of the two magnetic fields generates torque, and subsequently, rotation of rotor assembly 120.

Station 100 receives natural gas via inlet pipeline 110 at a first predetermined pressure. The gas is channeled to compressor 102 via suction fixture 108. Gas subsequently flows into compressor 102 and is compressed to a greater density and smaller volume at a second predetermined pressure that is greater than the first predetermined pressure. The compressed gas is discharged to outlet pipeline 116 via discharge fixture 114.

In the exemplary embodiment, station 100 includes a motor transport fluid supply pipe 133 and a motor transport fluid return pipe 134. Supply pipe 133 is coupled in flow communication with inlet pipeline 110 and motor end cover 118. Return pipe 134 is coupled in flow communication with motor portion 105 of housing 106 and suction fixture 108. Pipes 133 and 134 may be fabricated of metal, rubber, polyvinylchloride (PVC), or any material that attains predetermined operational parameters associated with the fluid being transported and the location of station 100. Pipes 133 and 134 are sized to facilitate initial filling of, and subsequently facilitate maintaining fluid pressure within housing portion 105 at a pressure substantially similar to the fluid pressure within inlet fixture 108.

Supply pipe 133 includes a motor supply valve 135 and return pipe 134 includes a motor return check valve 136. Check valve 136 facilitates mitigating channeling transport fluid from fixture 108 to pipe 134 and subsequently into housing portion 105. In the exemplary embodiment, valve 135 is a throttling-type valve that is adjusted to predetermined open positions to facilitate channeling a predetermined flow of transport fluid through motor 104 as well as a predetermined rate of pressurization of housing portion 105. Valve 135 may be, but not be limited to a needle valve. Alternatively, valve 135 may be an isolation-type valve that may include, but not be limited to a gate valve wherein a predetermined fluid flow rate and a predetermined rate of pressurization are facilitated with devices that may include, but not be limited to at least one flow orifice (not shown). System 100 further includes a motor-compressor housing seal 137 that facilitates mitigating flow communication between motor portion 105 of housing 106 and compressor portion 103 of housing 106. In the exemplary embodiment, seal 137 is an internal seal configured to withstand the relatively small differential pressures that may occur between motor housing 105 and compressor inlet 108. Alternatively, seal 137 may be configured to withstand relatively larger pressure differences, for example, but not being limited to the differential pressures between the transport fluid within motor housing 105 and the ambient conditions external to station 100.

In operation, a portion of transport fluid is channeled from inlet pipeline 110 towards motor end cover 118 as the associated arrows illustrate. The transport fluid is channeled through motor 104 (as described in detail below) and subsequently channeled to suction fixture 108 via return pipe 134.

Figure 2:
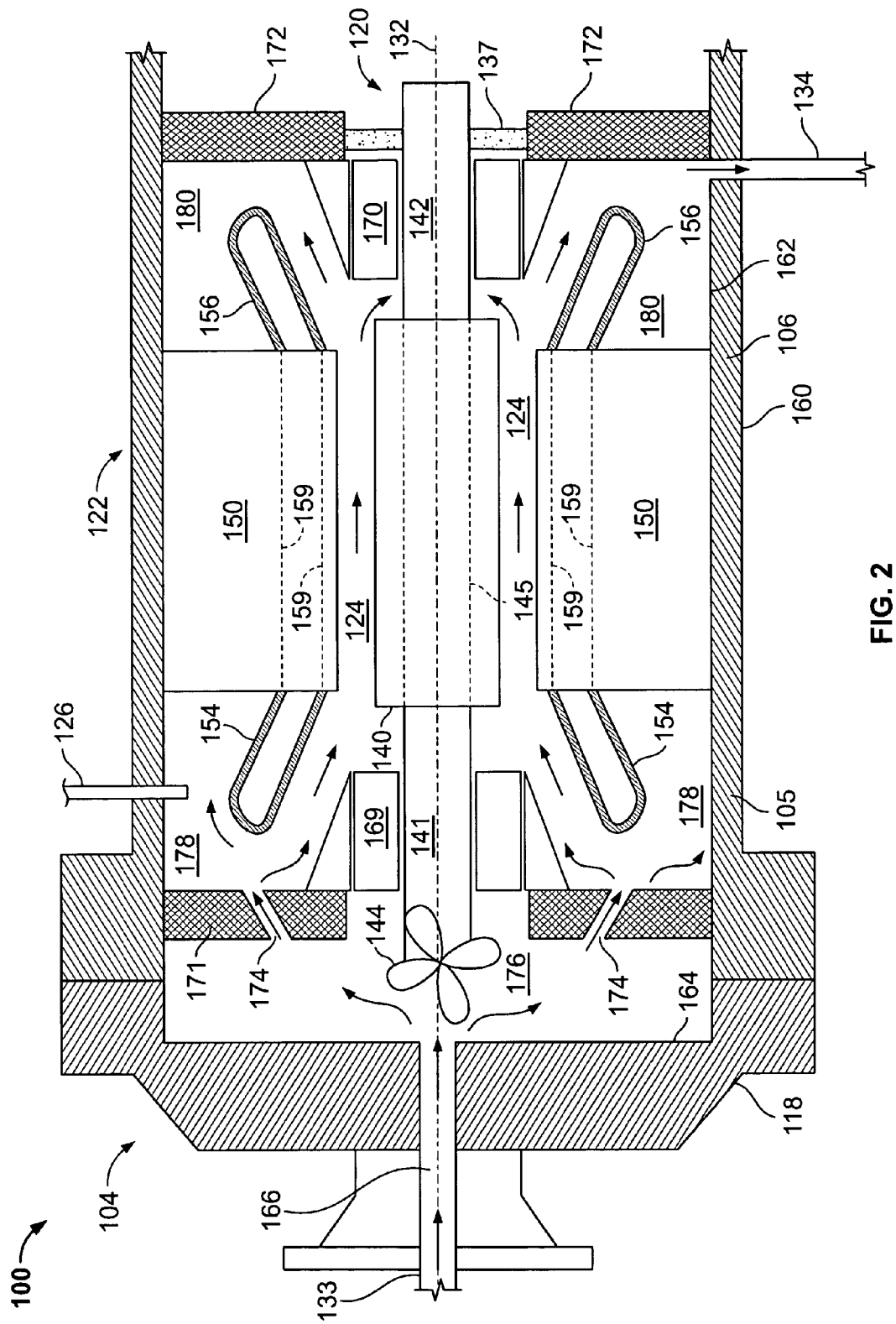
FIG. 2 is a cross-sectional schematic view of an exemplary electric motor that may be used with the fluid transport station shown in FIG. 1.

FIG. 2 is a cross-sectional schematic view of exemplary motor 104 that may be used with fluid transport station 100 (shown in FIG. 1). As described above, motor 104 includes an end cover assembly 118, rotor assembly 120, stator 122, gap 124, electric cable conduit 126, axis 132 and seal 137. Housing 106 encloses motor 104 within housing portion 105.

Rotor assembly 120 includes a permanent magnet portion 140 (discussed in more detail below). A plurality of permanent magnets 148 (shown in FIG. 3) is encased within the periphery of portion 140. Rotor assembly 120 also includes an outboard spindle portion 141, an inboard spindle portion 142 and a substantially central portion 145. Portion 140 is coupled to spindle central portion 145 such that at least a portion of spindle inboard and outboard portions 142 and 141, respectively, extend from each axial end of portion 140. Also, portion 140 is coupled to spindle portions 145 such that rotational forces generated within portion 140 generate rotation in portion 140 as well as portions 141, 142 and 145. Central portion 145 includes a diameter that may be less than, equal to or greater than the diameters of portions 141 and 142 to facilitate coupling permanent magnet portion 140 to spindle portion 145.

An internal fluid transport apparatus 144 is rotatably coupled to a portion of rotor 120. In the exemplary embodiment, apparatus 144 is a fan 144 coupled to an outboard-most portion of spindle portion 141. Fan 144 is dimensioned and positioned to facilitate fluid flow within housing portion 105. Alternatively, apparatus 144 may include, but not be limited to a pump or any device that attains predetermined parameters associated with the fluid being transported within housing portion 105. Also, alternatively, apparatus 144 may be positioned within housing portion 105 wherever predetermined operational parameters are attained.

Stator 122 includes a substantially toroidal stator core portion 150. Core portion 150 is positioned within housing portion 105 such that rotor assembly permanent magnet portion 140 and stator core portion 150 define annular gap 124. Core 150 is fixedly coupled to housing portion 105. Stator 122 also includes armature windings, the outboard and inboard end windings, or end turn, portions 154 and 156, respectively. Portions 154 and 156 are electrically coupled to and extend axially outward from core portion 150. Portions 154 and 156 are positioned on axially opposing ends of stator core portion 150.

Housing 106 includes a peripheral surface 160 and a radially inner surface 162. In the exemplary embodiment, housing 106, peripheral surface 160 and surface 162 are substantially cylindrical. Alternatively, housing 106 and its associated components may be of any shape and/or configuration that attain predetermined operating parameters. Also, in the exemplary embodiment, the radial distance between surfaces 160 and 162, i.e., the thickness of housing 106, and the materials of fabrication of housing 106 are sufficient to facilitate tolerating operating parameters such as, but not being limited to external operating pressures and temperatures associated with the depth and body of water in which station 100 is submerged as well as the properties of the fluid being transported.

End cover assembly 118 includes a radially circumferential surface 164 and a fluid supply passage 166 defined within assembly 118 that is coupled in flow communication with supply pipe 133. Fluid supply passage 166 is sized to facilitate initial filling of, and subsequently facilitate maintaining fluid pressure within housing portion 105 at a pressure substantially similar to the fluid pressure within inlet fixture 108 (shown in FIG. 1). Passage 166 also facilitates controlling a rate of pressurization of housing portion 105 to a predetermined rate.

Motor 104 further includes an outboard magnetic bearing 169 and an inboard magnetic bearing 170 as well as an outboard bearing support member 171 and an inboard bearing support member 172. In the exemplary embodiment, members 171 and 172 are substantially annular and are fixedly secured to housing radially inner surface 162 and project radially inward toward rotor assembly 120 from surface 162. Member 171 has at least one open passage 174 formed within member 171 to facilitate fluid flow within housing portion 105 as described further below. Alternatively, members 171 and 172 may be, but not be limited to a plurality of radially extending members shaped, configured and dimensionally positioned to support bearings 169 and 170 and facilitate fluid flow within housing portion 105 as described further below. Surfaces 162 and 164, bearing 169 and bearing support member 171 define a fluid inlet plenum 176 that is coupled in flow communication with fan 144, and passages 166 and 174 and facilitates channeling fluid to fan 144.

A portion of surface 162, bearing 169, bearing support member 171, and an outboard surface of stator core portion 150 define a substantially annular outboard end turn fluid plenum 178. Plenum 178 is coupled in flow communication with passage 174 and gap 124. Also, a portion of surface 162, bearing 170, bearing support member 172, and an inboard surface of stator core portion 150 define a substantially annular inboard end turn fluid plenum 180. Plenum 180 is coupled in flow communication with gap 124 and pipe 134. In the exemplary embodiment, gap 124 channels transport fluid through a single axial flow path between plenums 178 and 180. Alternatively, the invention as described herein may also be inserted into motors 104 wherein a plurality of flow paths channel transport fluid into and out of gap 124 via a plurality of substantially radial cooling channels through and/or around stator core 150.

Magnetic bearings 169 and 170 facilitate radial positioning of rotor assembly 120. In the exemplary embodiment, magnetic bearings 169 and 170 are configured to be an active-type of magnetic bearing. More specifically, a control sub-system (not shown) is used in conjunction with magnetic bearings 169 and 170 to determine the radial position of the rotational bearing component (not shown) relative to a fixed component (not shown) at any given time and facilitate magnetic adjustments to correct any deviations at any given angular position. Magnetic bearings 169 and 170 facilitate operation of rotor assembly 120 at the aforementioned high speeds associated with exemplary motor 104. Alternatively, non-magnetic bearings that include, but not be limited to journal bearings, for example, that attain predetermined parameters, that include, but are not limited to mitigating vibration and friction losses may be used. At least one rundown bearing (not shown) may be positioned within motor 104 in a manner similar to bearings 169 and 170 to facilitate radial support to rotor assembly 120 in event of magnetic bearings 169 and/or 170 failure. Furthermore, at least one thrust bearing (not shown) may be positioned within motor 104 in a manner similar to bearings 169 and 170 to facilitate mitigating the effects of axial thrust of rotor assembly 120 and shaft 128 (shown in FIG. 1).

Station 100 may be employed in transporting fluids with aggressive properties and/or impurities. These fluids may be introduced into housing portion 105 for purposes of lubrication and/or cooling of motor 104 components.

In operation, the fluid being transported by compressor 102 is also used to facilitate cooling of motor 104 as illustrated with arrows in FIG. 2. Prior to electrically powering stator 122 and starting motor 104, as discussed above, housing portion 105 is filled with transport fluid and attains a pressure substantially similar to that of inlet pipeline 110 and suction fixture 108 (both shown in FIG. 1) since it is coupled in flow communication with pipeline 110 and fixture 108. Pipes 133 and 134, plenums 176, 178 and 180 and gap 124 are filled with transport fluid and are in substantial pressure equilibrium. Once motor 104 is powered and rotor assembly 120 is rotating, fan 144 forms a low pressure region locally in the vicinity of the region wherein passage 166 couples in flow communication with inlet plenum 176 and also forms a local high pressure region within plenum 176. Transport fluid is channeled from passage 166 and is channeled into passage 174 that is coupled in flow communication with plenum 176. Transport fluid is then channeled into plenum 178 wherein the fluid removes heat from a portion of stator core portion 150 and from portion 154. Fluid is further channeled through gap 124 wherein heat is removed from a portion of stator core portion 150 and rotor assembly magnet portion 140. The fluid is then channeled into plenum 180 wherein heat is removed from a portion of stator core portion 150 and from portion 156. Fluid is subsequently channeled to pipe 134.

Figure 3:
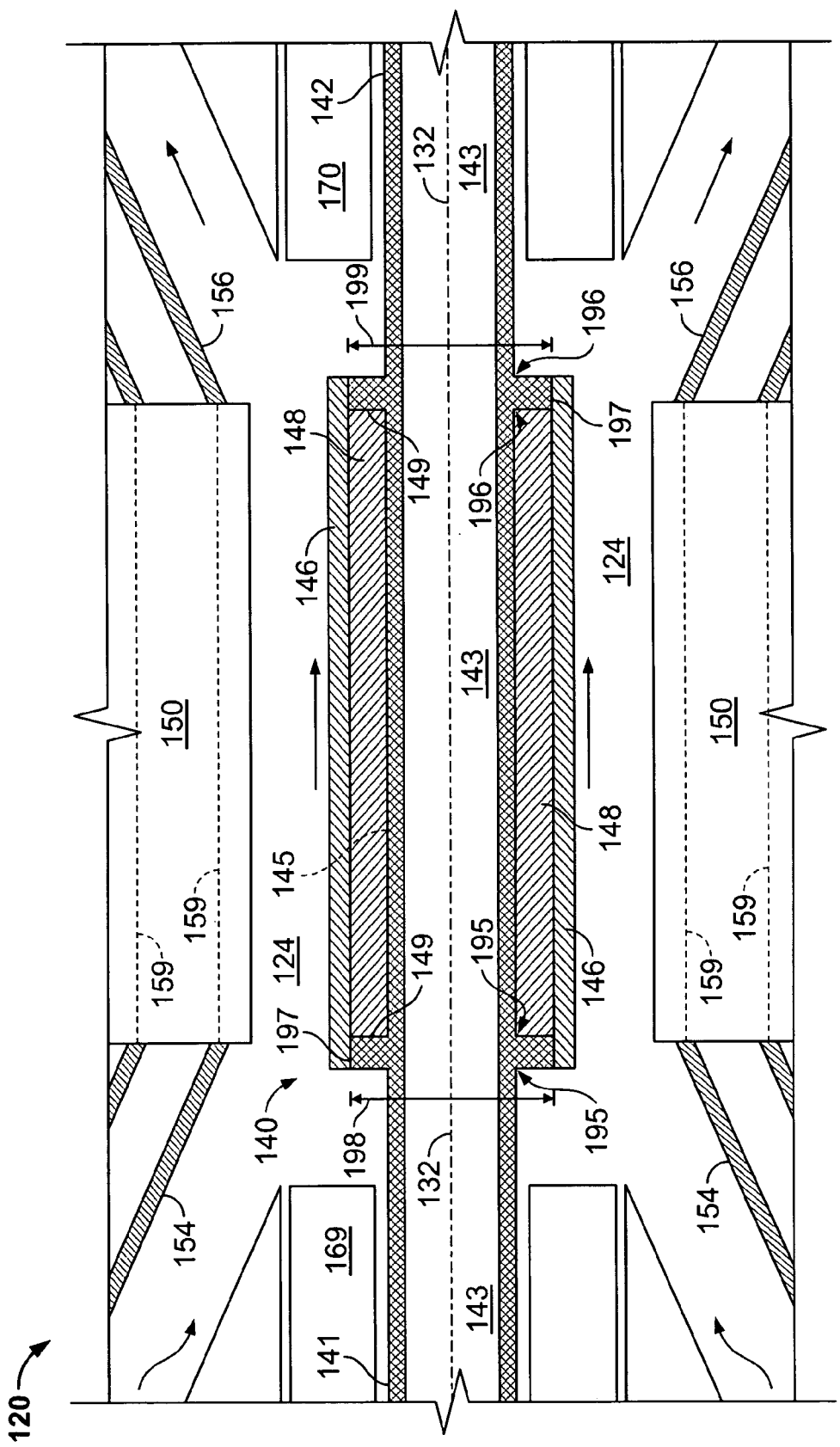
FIG. 3 is an enlarged cross-sectional schematic view of an exemplary rotor assembly that may be used with the electric motor shown in FIG. 2.
Figure 4:
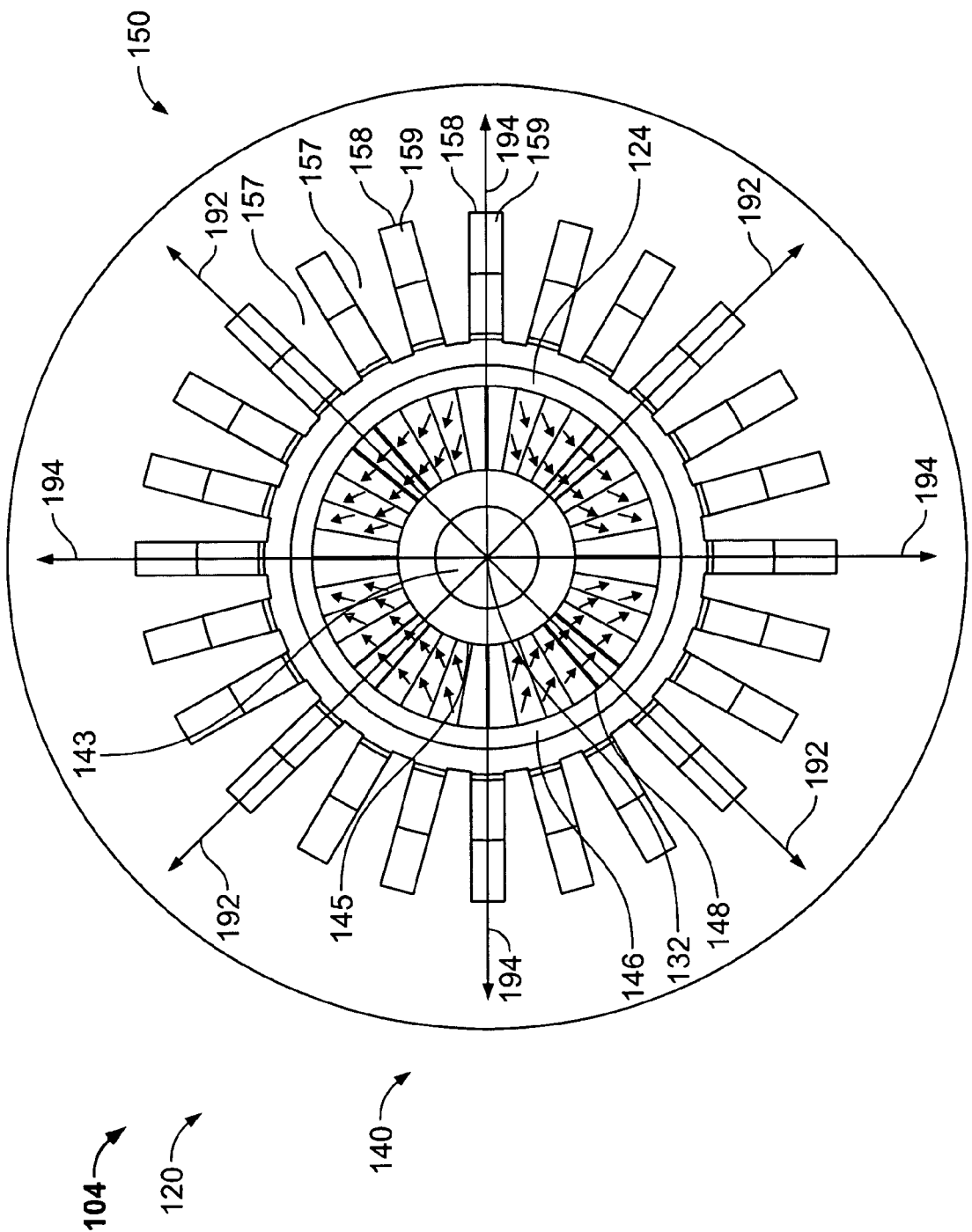
FIG. 4 is a cross-sectional schematic axial view of the exemplary rotor assembly that may be used with the electric motor shown in FIG. 2.
Figure 5:
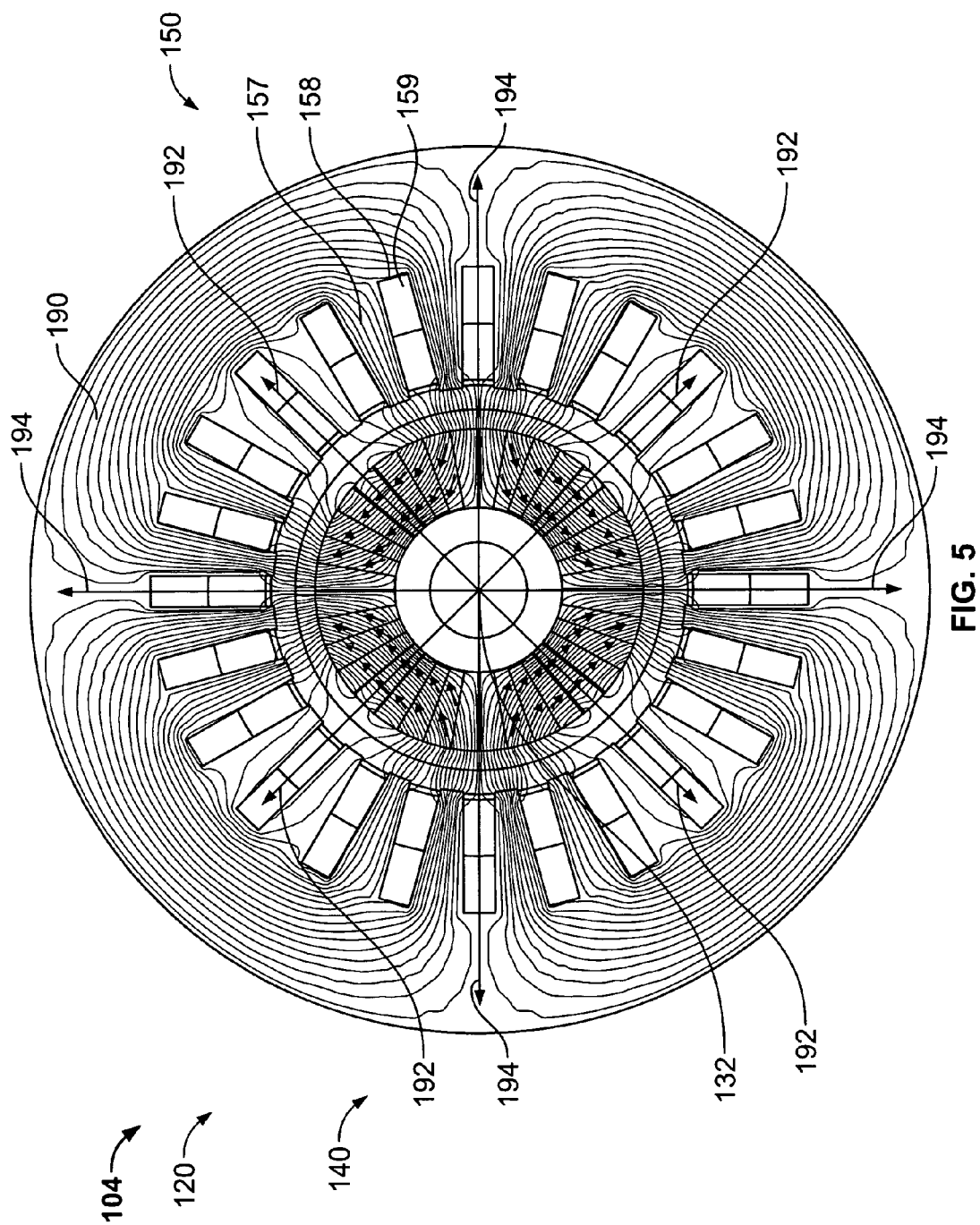
FIG. 5 is a cross-sectional schematic axial view of the exemplary rotor assembly and a magnetic field that may be used with the electric motor shown in FIG. 2.

FIG. 3 is an enlarged cross-sectional schematic view of exemplary rotor assembly 120 that may be used with electric motor 104 (shown in FIG. 2). Stator end winding portions 154 and 156, bearings 169 and 170 and axis of rotation 132 are illustrated for perspective. FIG. 4 is a cross-sectional schematic axial view of exemplary rotor assembly 120 that may be used with electric motor 104 (shown in FIG. 2). FIG. 5 is a cross-sectional schematic axial view of exemplary rotor assembly 120 and a magnetic field that may be used with electric motor 104. FIGS. 3, 4 and 5 are referenced together for the following discussion of motor 104.

Motor 104 includes stator 122. Stator 122 includes a plurality of stator teeth 157 formed within stator core 150. Teeth 157 define a plurality of stator armature winding slots 158. Armature windings 159 are positioned axially within slots 158 and are substantially parallel to axis 132 with the exception of armature winding end turn portions 154 and 156.

Motor 104 also includes rotor assembly 120. Rotor assembly 120 includes substantially cylindrical rotor spindle portions 141, 142 and 145, a substantially cylindrical magnet enclosure 146 and a substantially cylindrical array of permanent magnets 148 positioned between spindle portion 145 and enclosure 146. In the exemplary embodiment, spindle portions 141, 142 and 145 are fabricated from Inconel 725® and form a cavity 143 within the center of spindle portions 141, 142 and 145. Alternatively, spindle portions 141, 142 and 145 may be fabricated from any material that attains predetermined operational parameters that include, but are not limited to corrosion resistance and magnetic permeability. For example, in the alternative embodiments, materials that mat be used include, but are not limited to Incoloy 925®, Inconel 718® or a magnetic steel alloy with a protective layer, wherein the protective layer may include, but not be limited to a ceramic composite, polymer coating, and metallic plating such as, for example, nickel or high-phosphorous nickel.

In general, corrosion resistance against the corrosive characteristics of the fluid being transported is desired. Furthermore, a material for enclosure 146 having a low relative magnetic permeability is desired to facilitate mitigating deformation of a magnetic field formed by rotor assembly 120 as is known in the art. For example, unsaturated pure iron has a relative magnetic permeability of 1000 to 5000 and Inconel® alloys generally have a relative magnetic permeability of 1.002 to 1.010. These are referenced to a value of 1.000 associated with the relative magnetic permeability of free space (i.e., air or vacuum). Relative magnetic permeability is a unit-less parameter. In general, materials with a high magnetic permeability are referred to as magnetic materials and those materials with a low magnetic permeability are referred to as non-magnetic. Therefore, Inconel® alloys are typically considered to be non-magnetic.

In an alternative embodiment, spindle portions 141 and 142 may include at least one layer (not shown) of a corrosion-resistant and non-magnetic material that may include, but not be limited to ceramic composite, polymer coating, and metallic plating such as, for example, nickel or high-phosphorous nickel (not shown). The layer may be formed by methods that include, but are not limited to spraying, coating and plating techniques known in the art or by fixedly coupling portions of the material with predetermined dimensions to spindle portions 141 and 142. The layer or layers may extend over substantially all of a radially outermost surface of spindle portions 141 and 142 that may be exposed to the transport fluid within housing portion 105 (shown in FIGS. 1 and 2).

In the exemplary embodiment, cavity 143 is not filled, i.e., spindle portions 141, 142 and 145 are hollow. Alternatively, spindle portions 141, 142 and 145 may be solid. Further, alternatively, cavity 143 may be filled with a material that facilitates attaining operational parameters that include, but are not limited to light weight of motor 104, high rotor assembly 120 speeds, and low rotor assembly 120 vibrations.

Permanent magnet array 148 includes a plurality of permanent magnets 148 fixedly coupled to and surrounding an outer periphery of spindle portion 145. Magnets 148 extend axially along spindle portion 145 and are substantially parallel to axis 132. Methods of coupling magnets 148 to spindle portion 145 may include, but not be limited to adhesive bonding and sintering such that a preloaded low tolerance fit is attained. A pressurized interference fit may be used that includes, but is not limited to a thermal shrink fit and/or a hydraulic shrink fit.

Magnets 148 may include, but are not limited to, high energy density rare earth permanent magnet materials, for example, Neodymium-Iron-Boron (Nd—Fe—B, or $Nd_2Fe_5B$) or Samarium-Cobalt (Sm—Co, or $SmCo_5$). In the exemplary embodiment, Nd—Fe—B is used. Alternatively, Sm—Co is used. An index that is typically used to define and compare the energy densities of magnets, including permanent magnets, is a Maximum Energy Product, often referred to as $BH_{Max}$. $BH_{Max}$ is a product of a magnetic field flux density (B) multiplied by an associated magnetic field strength (H) for a particular magnetic field. A resultant product represents a maximum, theoretically possible, energy density associated with a particular magnet. Common values of $BH_{Max}$ for Nd—Fe—B permanent magnets may be in the range of 80 to 380 kilojoules per cubic meter ($kJ/m^3$). Common values of $BH_{Max}$ for Sm—Co permanent magnets may be in the range of 120 to 260 $kJ/m^3$. For comparison, magnets with lower energy densities include flexible permanent magnets with $BH_{Max}$ in the range of 5 to 13 $kJ/m^3$. The higher energy densities of the Nd—Fe—B and Sm—Co permanent magnets facilitate a greater resistance to demagnetization and longer useful in-service life. Alternatively, non-rare earth permanent magnets may be used.

Subsequent to coupling to spindle portion 145, each of segments 148 is exposed to a driving magnetic field such that each of segments 148 attains a predetermined magnetic remanence that includes a unique predetermined magnetic polarity. Remanence is a measure of a remaining, or residual magnetic flux density, i.e., magnetization of segments 148 subsequent to their removal from the driving magnetic field. Remanence is typically measured in tesla (T). For example, Nd—Fe—B and Sm—Co typically have remanences of approximately 1.2 T and 0.83 T, respectively, wherein these values are generally considered to be relatively strong remanences. A polarity of each of segments 148 is illustrated by small arrows in FIG. 4.

In the exemplary embodiment, segments 148 are positioned in a predetermined sequence wherein the segment remanence polarity follows a repeated cycle over each magnetic pole pair progressing circumferentially about spindle portion 145. The predetermined positioning of segments 148 facilitates generating a predetermined distributed magnetic field 190 around rotor 120. This effect is often referred to in the art as the Halbach effect and array 148 may be referred to as a Halbach array. The Halbach effect as described herein facilitates using a smaller volume of magnets 148 while attaining predetermined magnetic flux patterns that facilitate operation of station 100. In the exemplary embodiment, the flux pattern is substantially sinusoidal as observed about a periphery of array 148 within air gap 124. Alternatively, the predetermined flux patterns may include, but not be limited to trapezoidal, triangular and rectangular patterns as observed about the periphery of array 148 within air gap 124. Furthermore, a smaller volume of magnets 148 may facilitate mitigating initial construction costs and subsequent operation costs of station 100 by facilitating a more compact design with lower mechanical stresses, decreased assembly resources and a decreased weight and footprint.

Additional benefits of Halbach array 148 include the use of more efficient magnetization methods. Moreover, the pattern of magnetic field 190 facilitates mitigating the amount of field 190 that typically enters shaft 145, therefore, array 148 facilitates the use of non-magnetic and corrosion-resistant shaft materials. In the exemplary embodiment, motor 104 is a four-pole motor that includes eight permanent magnet segments 148 per pole. Alternatively, motor 104 may be, but not be limited to a two-pole motor (discussed further below), a six-pole motor and/or any configuration that attains predetermined operational parameters associated with station 100. Further, alternatively, any number of segments 148 may be used for each pole. Typically, a more efficient magnetic coupling is facilitated as the number of magnets 148 per pole increases.

Under no load conditions, magnetic field 190 is substantially aligned with a plurality of quadrature (Q-) axes 192 and direct (D-) axes 194. In general, Q-axes 192 correspond to a region of rotor assembly 120 wherein a portion of magnetic field 190 is substantially tangential to a direction of rotation of rotor assembly 120 and wherein field 190 is most strongly peripherally directed. Also, generally, D-axes 194 correspond to a region of rotor assembly 120 wherein a portion of magnetic field 190 is substantially orthogonal to the direction of rotation of rotor assembly 120 and wherein field 190 is most strongly radially directed. Typically, there is also a corresponding relationship between the number of axes and the number of poles in that the number of Q-axes 192 and D-axes 194 is the same as the number of poles.

Figure 6:
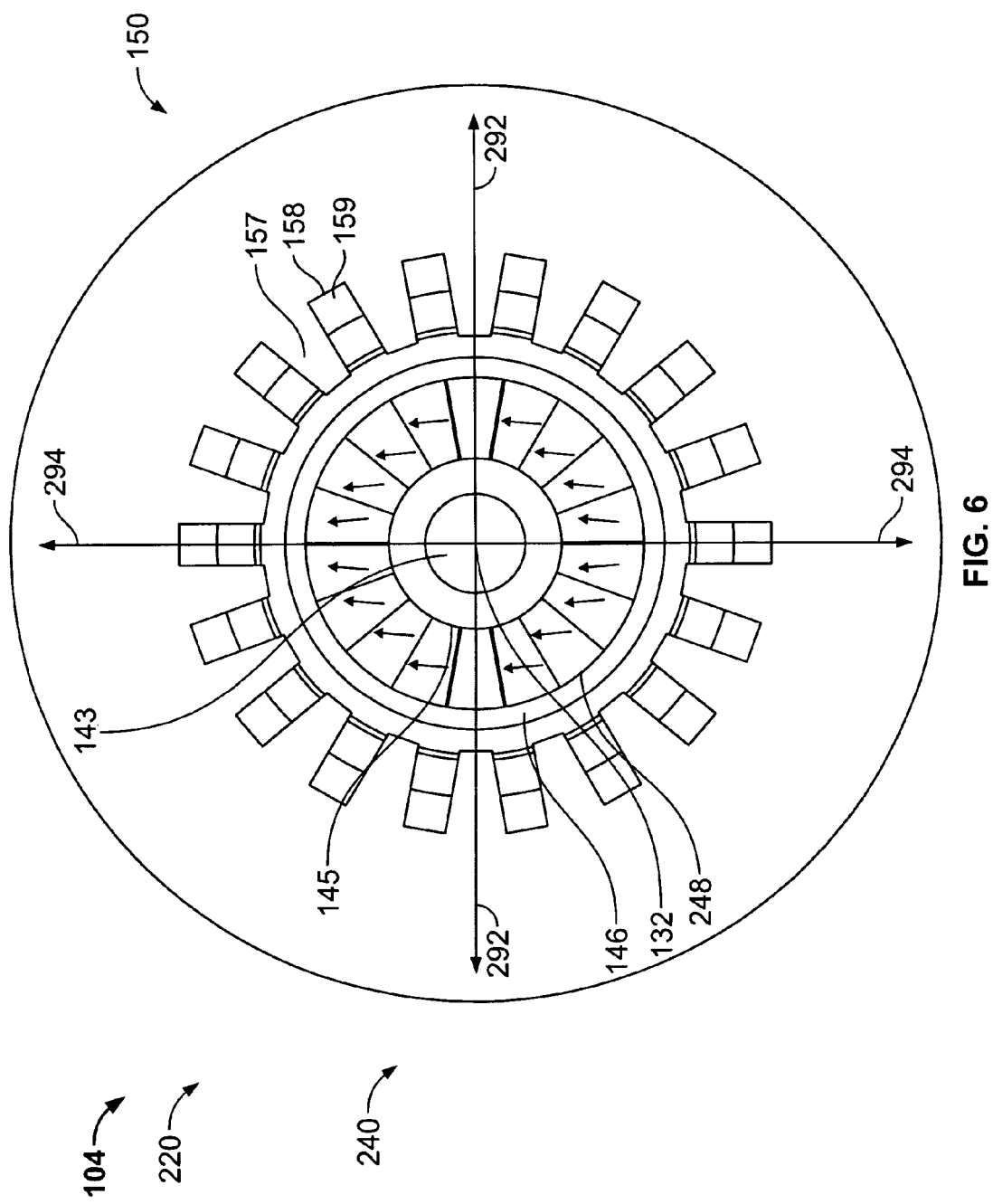
FIG. 6 is a cross-sectional schematic axial view of an alternative rotor assembly that may be used with the electric motor shown in FIG. 2.
Figure 7:
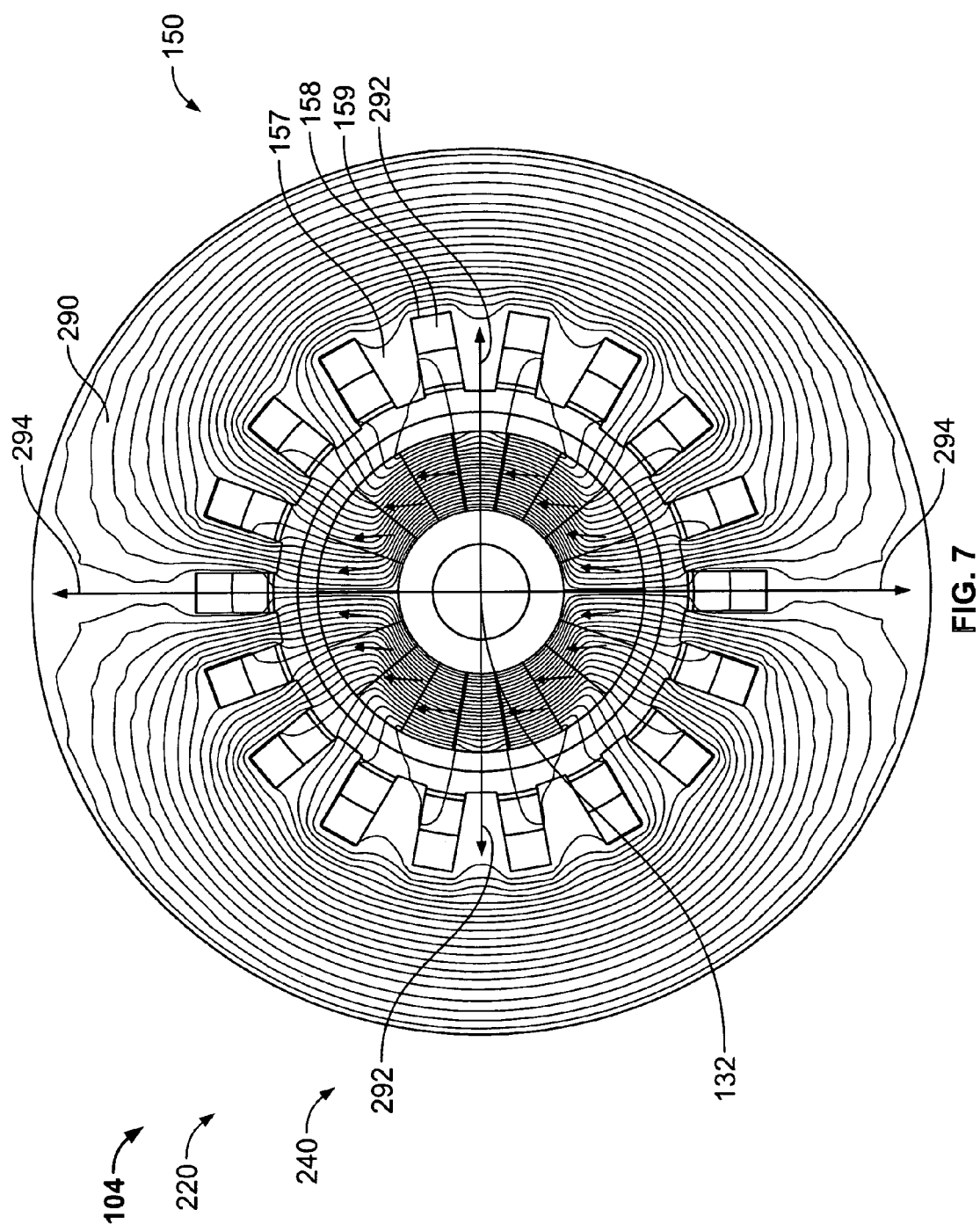
FIG. 7 is a cross-sectional schematic axial view of the alternative rotor assembly and a magnetic field that may be used with the electric motor shown in FIG. 2.

FIG. 6 is a cross-sectional schematic axial view of an alternative rotor assembly 220 that may be used with electric motor 104 (shown in FIG. 2). FIG. 7 is a cross-sectional schematic axial view of alternative rotor assembly 220 illustrating the magnetic field lines as they would appear under no load when used with electric motor 104. FIGS. 6 and 7 are referenced together for the following discussion of alternative rotor assembly 220. Alternative rotor assembly 220 includes an alternative permanent magnet portion 240 that includes a spindle portion 145, cavity 143, gap 146 and axis 132 that are substantially similar to those components in the exemplary embodiment. Stator portion 150 and teeth 157, slots 158 and armature windings 159 are also substantially similar to those components in the exemplary embodiment. Permanent magnet portion 240 also includes an array of permanent magnets 248 wherein array of permanent magnets 248 includes two poles with 8 permanent magnets per pole that generates magnetic field 290. Under no load conditions, field 290 is substantially aligned with a Q-axis 292 and a D-axis 294.

FIGS. 3, 4 and 5 are referenced for the following discussion. In the exemplary embodiment, magnet enclosure 146 (sometimes referred to as a magnet retaining ring) is substantially cylindrical and is fabricated from Inconel 725®. Alternatively, magnet enclosure 146 may be fabricated from any material that attains predetermined operational parameters that include, but are not limited to those that facilitate material and operational compatibility with magnets 148 and spindle portion 145, for example corrosion resistance and magnetic permeability. For example, in the alternative embodiments, materials that may be used include, but are not limited to Incoloy 925®, Inconel 718® or a stainless steel alloy, possibly with a protective layer, wherein the protective layer may include, but not be limited to a ceramic composite, polymer coating, or metallic plating, such as, for example, nickel or high-phosphorous nickel.

Also, alternatively, enclosure 146 may include at least one layer (not shown) of a corrosion-resistant and non-magnetic material that may include, but not be limited to Inconel® and/or a ceramic composite or polymer coating. The layer may be formed by methods that include, but are not limited to spraying, coating and plating techniques known in the art or by fixedly coupling portions of the material with predetermined dimensions to enclosure 146. The layer or layers may extend over substantially all of a radially outermost surface of enclosure 146.

Permanent magnets 148 are substantially isolated from the fluid being transported. In the exemplary embodiment, a plurality of end cap portions 149 are fabricated integrally with spindle portions 141, 142 and 145. End cap portions 149 are substantially toroidal and are positioned in the near vicinity of rotor portion axial interfaces 195 and 196 of spindle portions 141 and 145 and portions 142 and 145, respectively. End cap portions 149 include a substantially cylindrical radially outermost surface 197 and an associated diametric dimension 198 that is substantially similar to an inner diametric dimension 199 of enclosure 146.

Enclosure 146 is positioned over array of magnets 148 such that a preloaded low tolerance fit is attained between enclosure 146 and a circumferential surface of magnets 148 and such that at least a portion of enclosure 146 extends axially beyond both axial ends of the circumferential surface of array 148. In this manner, enclosure 146 also extends over end cap portions 149 such that a preloaded low tolerance fit is attained between enclosure 146 and end cap portions 149. A pressurized interference fit is used that includes, but is not limited to a thermal shrink fit and/or a hydraulic shrink fit. Also in the exemplary embodiment, seams defined at the fit regions by enclosure 146 and end cap portions 149 are sealed by welding. Alternatively, sealing methods that include, but not be limited to injecting a corrosion-resistant sealing material via capillary action may be used. Enclosure 146 and end cap portions 149 thereby facilitate mitigating flow communication between the transport fluid within motor 104 and array of permanent magnets 148. Moreover, enclosure 146 facilitates maintaining radial alignment of magnets 148.

Figure 8:
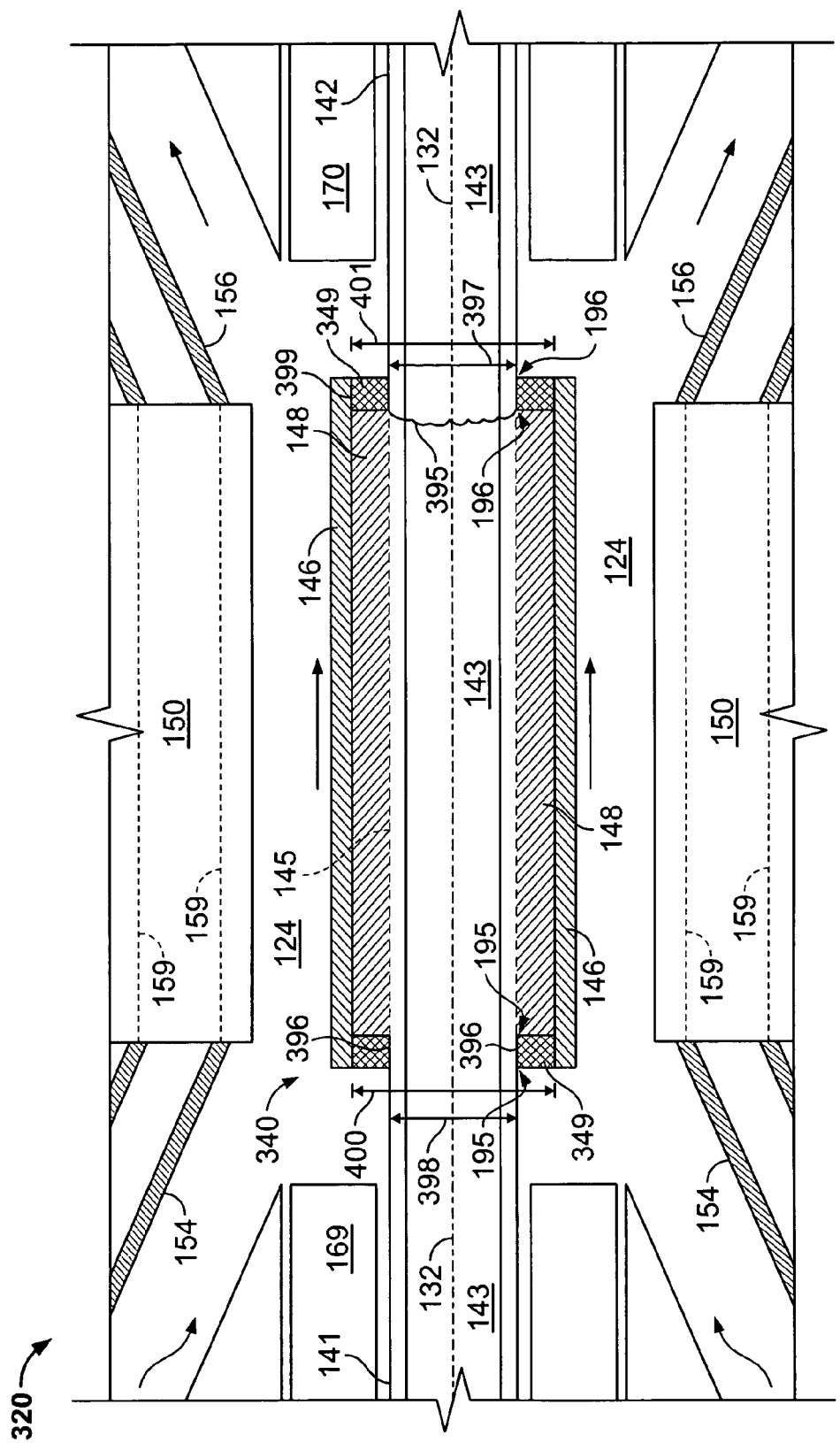
FIG. 8 is an enlarged cross-sectional schematic view of an alternative rotor assembly that may be used with the electric motor shown in FIG. 2.

FIG. 8 is an enlarged cross-sectional schematic view of alternative rotor assembly 320 that may be used with electric motor 104 (shown in FIG. 2). In alternative rotor assembly 320, a plurality of end caps 349 may be fabricated independently of spindle portions 141, 142 and 145. In this alternative embodiment, motor 104 includes alternative rotor assembly 320 that is substantially similar to exemplary rotor assembly 120 with the exception that permanent magnet portion 340 differs from exemplary magnet portion 140 as discussed below. Stator core 150, armature windings 159, end windings 154 and 156, bearings 169 and 170, spindle portions 141, 142 and 145, gap 124, axis 132 and rotor spindle cavity 143 are illustrated for perspective.

End caps 349 are substantially toroidal and each end cap 349 includes a substantially centered spindle access opening 395 formed by an inner annular wall 396. Substantially centered spindle access opening 395 includes a diametric dimension 397 substantially similar to a spindle portions 141, 142 and/or 145 diametric dimension 398 that facilitates inserting end caps 349 over spindle portions 141, 142 and 145. End caps 349 are positioned in the vicinity of rotor portion axial interfaces 195 and 196 of spindle portions 141 and 145 and portions 142 and 145, respectively, and subsequently, end caps 349 are coupled to spindle portions 141, 142 and/or 145 such that a preloaded low tolerance fit is attained as discussed further below. End caps 349 also include a substantially cylindrical radially outermost surface 399 and an associated diametric dimension 400 that is substantially similar to an inner diametric dimension 401 of enclosure 146 that facilitates forming a seal between end caps 349 and enclosure 146. Enclosure 146 is coupled to end caps 349 such that a preloaded low tolerance fit is attained as discussed further below.

In the alternative embodiment, end caps 349 are fabricated from Inconel 725®. Alternatively, end caps 349 may be fabricated from any material that attains predetermined operational parameters that include, but are not limited to those that facilitate material and operational compatibility with magnets 148 and spindle portions 141, 142 and 145, for example corrosion resistance and magnetic permeability. For example, in the alternative embodiments, materials that may be used include, but are not limited to Incoloy 925®, Inconel 718®, or a stainless steel alloy, possibly with a protective layer, wherein the protective layer may include, but not be limited to a ceramic composite, polymer coating, or metallic plating such as, for example, nickel or high-phosphorous nickel.

Also, alternatively, end caps 349 may include at least one layer (not shown) of a corrosion-resistant and non-magnetic material that may include, but not be limited to Inconel® and/or a ceramic composite, polymer coating, or metallic plating such as, for example, nickel or high-phosphorous nickel. The layer may be formed by methods that include, but are not limited to spraying, coating and plating techniques known in the art or by fixedly coupling portions of the material with predetermined dimensions to end caps 149. The layer or layers may extend over at least a portion of end caps 349 that includes, but is not limited to surfaces of end caps 349 that may be exposed to the transport fluid.

In this alternative embodiment, magnets 148 are substantially sealed within enclosure 146 and end caps 349 such that magnets 148 are isolated from an environment external to enclosure 146 and end caps 349. Enclosure 146 is positioned over array of magnets 148 such that a preloaded low tolerance fit is attained between enclosure 146 and a circumferential surface of magnets 148 and such that at least a portion of enclosure 146 extends axially beyond both axial ends of the circumferential surface of array 148. A pressurized interference fit is used to couple enclosure 146 to the circumferential surface of magnets 148 that includes, but is not limited to a thermal shrink fit and/or a hydraulic shrink fit. Also in this alternative embodiment, seams defined at a plurality of fit regions by axially outermost ends of both enclosure 146 and magnets 148 may be sealed by welding. Alternatively, sealing methods that include, but not be limited to injecting a corrosion-resistant sealing material via capillary action may be used.

Moreover, a pressurized interference fit is used to couple end caps 349 to rotor portions 141, 142 and 145 in the vicinity of rotor portion axial interfaces 195 and 196 using methods that include, but are not limited to a thermal shrink fit and/or a hydraulic shrink fit. Also in this alternative embodiment, seams defined at the fit regions by rotor portions 141, 142 and 145 and end caps 349 are sealed by welding. Alternatively, sealing methods that include, but not be limited to injecting a corrosion-resistant sealing material via capillary action may be used.

Furthermore, in this alternative embodiment, enclosure 146 also extends over end caps 349 such that a preloaded low tolerance fit is attained between enclosure 146 and end caps 349. A pressurized interference fit is used that includes, but is not limited to a thermal shrink fit and/or a hydraulic shrink fit. Also in the exemplary embodiment, seams defined at the fit regions by enclosure 146 and end caps 349 are sealed by welding. Alternatively, sealing methods that include, but not be limited to injecting a corrosion-resistant sealing material via capillary action may be used. Enclosure 146 and end caps 349 thereby facilitate mitigating flow communication between the transport fluid within motor 104 and array of permanent magnets 148.

A further alternative embodiment may include a combination of the aforementioned embodiments, for example, but not limited to fabricating one end cap portion 149 integral to spindle portions 141 and 145 and one independently fabricated end cap 349 inserted over spindle portion 142 and inserted onto spindle portion 145.

A further alternative embodiment includes forming on bearings 169 and 170 surfaces at least one layer (neither shown) of a corrosion-resistant and non-magnetic material that may include, but not be limited to Inconel® and/or a ceramic composite, polymer coating, or metallic plating such as, for example, nickel or high-phosphorous nickel. The layer may be formed by methods that include, but are not limited to spraying, coating and plating techniques known in the art or by fixedly coupling portions of the material with predetermined dimensions to bearings 169 and 170 surfaces. The layer or layers may extend over substantially all of the rotational bearing component surfaces, the fixed component surfaces and bearing enclosure surfaces (all not shown).

The compressing station described herein facilitates transporting natural gas through a pipeline. More specifically, the compressing station assembly includes a compressing device coupled to a permanent magnet-type super-synchronous electric motor. Permanent magnet-type super-synchronous electric motors have advantages over electric induction motors in that they have fewer components exposed at the rotor surface, as well as the advantages of higher efficiency due to lower losses at the rotor surface. As a result, the operating efficiency of compressing stations may be increased and the stations' capital and maintenance costs may be reduced.

The methods and apparatus for transporting a fluid within a pipeline described herein facilitate operation of a fluid transport station. More specifically, the motor as described above facilitates a more robust fluid transport station configuration. Such motor configuration also facilitates efficiency, reliability, and reduced maintenance costs and fluid transport station outages.

Exemplary embodiments of motors as associated with fluid transport station are described above in detail. The methods, apparatus and systems are not limited to the specific embodiments described herein nor to the specific illustrated motors and fluid transport station.

While the invention has been described in terms of various specific embodiments, those skilled in the art will recognize that the invention can be practiced with modification within the spirit and scope of the claims.

What is claimed is:

1. An electrical machine for use in transporting a fluid, said machine comprising:
   a housing sized to contain at least a portion of the transported fluid for use in cooling said electrical machine;

a stator assembly positioned within said housing; and a substantially corrosion-resistant rotor assembly positioned within said housing such that a gap is defined between said rotor assembly and said stator assembly, said gap for channeling the transported fluid between said stator assembly and said rotor assembly, said rotor assembly comprising an array of magnets configured to generate a distributed magnetic field with a Halbach effect, and at least one enclosure comprising a substantially corrosion-resistant and non-magnetic material, said at least one enclosure is sized to contain at least a portion of said array of magnets therein.

2. An electrical machine in accordance with claim 1 wherein said array of magnets comprises a plurality of circumferentially-spaced permanent magnets configured to generate a substantially sinusoidal magnetic field about a rotor periphery.

3. An electrical machine in accordance with claim 2 wherein said plurality of circumferentially-spaced permanent magnets comprises a plurality of adjacent permanent magnets, wherein each of said adjacent permanent magnets has a different predetermined magnetic remanence with a different predetermined magnetic polarization.

4. An electrical machine in accordance with claim 1 wherein said rotor assembly further comprises: at least one rotor assembly spindle comprising a substantially corrosion-resistant material, wherein said rotor assembly spindle is sized to receive at least a portion of said array of magnets therein; and at least one end cap comprising a substantially corrosion-resistant material coupled to said magnet enclosure, said at least one end cap extending from said rotor assembly spindle.

5. An electrical machine in accordance with claim 4 wherein said at least one end cap is removably coupled to said rotor assembly spindle.

6. An electrical machine in accordance with claim 1 wherein said rotor assembly further comprises: at least one rotor assembly spindle sized to receive at least a portion of said array of magnets, wherein said rotor assembly spindle comprises at least one substantially corrosion-resistant material layer extending over at least a portion of said rotor assembly spindle, said at least one substantially corrosion-resistant and non-magnetic material layer of said array enclosure extends over at least a portion of said array enclosure; and at least one end cap extending from said rotor assembly spindle, wherein said at least one end cap comprises at least one substantially corrosion-resistant material layer extending over at least a portion of said at least one end cap.

7. An electrical machine in accordance with claim 6 wherein said at least one end cap is removably coupled to said spindle.

* * * * *